(12) United States Patent
Bartlett et al.

(10) Patent No.: US 11,554,734 B2
(45) Date of Patent: Jan. 17, 2023

(54) ENHANCED DISCRIMINATION METHOD AND APPARATUS FOR CONTROLLING AN ACTUATABLE PROTECTION DEVICE

(71) Applicant: ZF FRIEDRICHSHAFEN AG, Friedrichshafen (DE)

(72) Inventors: Charles A. Bartlett, Commerce Township, MI (US); Huahn-Fern Yeh, Novi, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 372 days.

(21) Appl. No.: 16/824,065

(22) Filed: Mar. 19, 2020

(65) Prior Publication Data

US 2021/0291770 A1 Sep. 23, 2021

(51) Int. Cl.
| | |
|---|---|
| *B60R 21/0132* | (2006.01) |
| *B60R 21/23* | (2006.01) |
| *B60R 21/231* | (2011.01) |
| *B60R 21/232* | (2011.01) |
| *B60R 21/013* | (2006.01) |

(Continued)

(52) U.S. Cl.
CPC .......... *B60R 21/0132* (2013.01); *B60R 21/23* (2013.01); *B60L 3/0046* (2013.01); *B60R 21/232* (2013.01); *B60R 21/23138* (2013.01); *B60R 22/195* (2013.01); *B60R 22/46* (2013.01); *B60R 2021/0018* (2013.01); *B60R 2021/0027* (2013.01); *B60R 2021/01306* (2013.01); *B60R 2021/01325* (2013.01); *B60R 2021/01327* (2013.01); *B60Y 2200/91* (2013.01)

(58) Field of Classification Search
None
See application file for complete search history.

(56) References Cited

U.S. PATENT DOCUMENTS

| | | | |
|---|---|---|---|
| 6,542,073 B2 | 4/2003 | Yeh et al. | |
| 6,542,792 B2 * | 4/2003 | Schubert | B60R 21/013 |
| | | | 701/1 |

(Continued)

FOREIGN PATENT DOCUMENTS

| | | |
|---|---|---|
| DE | 102005024723 A1 | 12/2006 |
| DE | 102006045303 B3 | 2/2008 |

(Continued)

*Primary Examiner* — Faye M Fleming
(74) *Attorney, Agent, or Firm* — Tarolli, Sundheim, Covell & Tummino LLP

(57) ABSTRACT

A vehicle safety system includes an actuatable restraint for helping to protect a vehicle occupant and a controller for controlling actuation of the actuatable restraint in response to a vehicle rollover event. The controller is configured to execute a discrimination algorithm comprising at least one classification metric that utilizes at least one of vehicle pitch rate (P_RATE) and vehicle roll acceleration (D_RATE) to discriminate at least one of a ramp rollover event and a soil rollover event from an embankment rollover event. The discrimination algorithm determines a classification of the vehicle rollover event as one of a ramp rollover event, a soil rollover event, and an embankment rollover event. The controller is also configured to select a deployment threshold for deploying the actuatable restraint. The deployment threshold corresponds to the classification of the vehicle rollover event.

15 Claims, 8 Drawing Sheets

(51) Int. Cl.
    *B60R 22/195*    (2006.01)
    *B60R 22/46*     (2006.01)
    *B60R 21/00*     (2006.01)
    *B60L 3/00*      (2019.01)

(56) References Cited

U.S. PATENT DOCUMENTS

| | | | |
|---|---|---|---|
| 6,687,575 B2 | 2/2004 | Mattes et al. | |
| 8,086,376 B2 * | 12/2011 | McCoy | B60R 21/0134 340/440 |
| 8,525,728 B2 | 9/2013 | Lundmark et al. | |
| 9,650,006 B2 | 5/2017 | Foo et al. | |
| 10,293,836 B2 | 5/2019 | Laakmann et al. | |
| 2008/0262680 A1 * | 10/2008 | Yeh | B60R 21/0132 701/45 |
| 2009/0138160 A1 | 5/2009 | Iyoda | |
| 2012/0330512 A1 | 12/2012 | Mahlisch | |
| 2013/0332032 A1 | 12/2013 | Korn et al. | |
| 2021/0284092 A1 * | 9/2021 | Balasu | G05D 1/0055 |

FOREIGN PATENT DOCUMENTS

| | | | | |
|---|---|---|---|---|
| DE | 102007032591 B3 | | 9/2008 | |
| DE | 19983044 B4 * | | 11/2009 | B60R 21/013 |
| DE | 102005024723 B4 * | | 5/2016 | B60R 21/0132 |

\* cited by examiner

ENHANCED DISCRIMINATION METHOD AND APPARATUS FOR CONTROLLING AN ACTUATABLE PROTECTION DEVICE

TECHNICAL FIELD

The present invention relates to a method and apparatus for controlling a vehicle actuatable occupant protection device and, in particular, to an enhanced discrimination method and apparatus for classifying several particular types of vehicle crash events.

BACKGROUND

Vehicle safety systems include a central control unit ("CCU") that utilizes sensors, both local to the CCU and remote from the CCU, to detect the occurrence of crash events involving the vehicle and to determine whether those events warrant the activation of actuatable restraints, such as airbags and seatbelt retractors. The sensors utilized by the CCU can include accelerometers and other sensors, such as impact sensors, seatbelt buckle switches, seat pressure switches, steering angle sensors, etc. Using data from these sensors, the CCU can determine the occurrence of vehicle crash events and can perform discrimination algorithms to classify the crash event as being one of a particular type. The CCU can actuate the actuatable restraints according to the particular type of crash event.

For vehicle safety systems, it is desirable to discriminate amongst the various crash events in which a vehicle can be involved. To "discriminate" a crash event can mean to classify the crash event as being of one particular type of crash event and distinguish that crash event from other types of crash events. If the vehicle safety system can discriminate or identify the crash event as being of one particular type, the actuatable restraints can be actuated in a manner tailored to that particular type of crash event. "Crash events," as used herein, can be used to encompass various events involving the vehicle. For example, crash events can be collisions or impacts in which the vehicle collides with, impacts, or otherwise engages different types of structures. These crash events can be collisions with a deformable barrier, such as another vehicle, or collisions with a non-deformable barrier, such as a tree or utility pole. As another example, crash events can also involve events, such as rollover events, where vehicle impacts result from the rolling over of the vehicle. Rollover events can result from a vehicle sliding sideways and striking a curb, from sliding or otherwise moving off the side of the road down an embankment, or from sliding or otherwise moving off the side of the road up a ramp, such as a hill.

Vehicle safety systems can be configured or adapted to discriminate those events for which deployment of the actuatable restraints is desired ("deployment events") from those events for which deployment of the actuatable restraints is not desired ("non-deployment events"). Crash discrimination entails determining the type of event, e.g., deformable barrier, non-deformable barrier, front impact crash, rear impact crash, side impact crash, oblique crash, offset crash, rollover, etc. Crash discrimination also entails determining the severity of the crash and implementing safing functions that act as checks or permissives to ensure that the actuatable restraints are deployed in a safe manner.

From the above, it will be appreciated that it can be desirable to control the actuation and timing of the actuatable restraints in the safety system in response to the type and/or severity of the crash event in which the vehicle is involved. To determine which occupant protection devices to actuate in response to a sensed crash event, the safety system can implement a crash evaluation process to discriminate between types of crash events. If the identified crash event meets or exceeds a severity threshold, and the safing functions agree, the actuatable restraints can be actuated in a manner commensurate with the discriminated event type.

Over the years, safety standards are modified and updated to "push the envelope" when it comes to automotive safety. As a result, in keeping up with the standards, automobile manufacturers are pushed to constantly improve the safety of their products. As the standards become more rigorous, the safety systems adapt and become more complex and capable. Through the evolution of vehicle safety systems, it has been discovered that crash classification is one of the key aspects that helps determine the efficacy of the system. If the safety system can accurately and robustly identify the crash scenario as defined by a safety standard, it can take measures tailored to produce the best results for occupants involved in accidents for which the standard is designed.

While vehicle safety systems have been developed with the ability to discriminate a variety of crash events, there exists a continuing need to further classify and discriminate amongst crash events so that the vehicle safety system can take the appropriate responsive action. Among the crash events for which discrimination can be desired are different types of side crash events, such as rollover events or events that can result in a rollover.

Side crash events are those for which it may be desirable to actuate safety devices, such as side airbags (curtain airbags, thorax airbags) and/or seatbelt pretensioners. Side crash events can occur in a variety of scenarios. For example, a vehicle can lose control and skid sideways off the road onto the adjacent grass/soil, down an embankment or up a ramp or hill. As another example, a vehicle can lose control and skid sideways into a low barrier, such as a curb. In any of these scenarios, the magnitude of the resulting side crash event may warrant actuating one or more vehicle safety devices.

SUMMARY

A vehicle safety system includes an actuatable restraint for helping to protect a vehicle occupant and a controller for controlling actuation of the actuatable restraint in response to a vehicle rollover event. The controller is configured to execute a discrimination algorithm comprising at least one classification metric that utilizes at least one of vehicle pitch rate (P_RATE) and vehicle roll acceleration (D_RATE) to discriminate at least one of a ramp rollover event and a soil rollover event from an embankment rollover event. The discrimination algorithm determines a classification of the vehicle rollover event as one of a ramp rollover event, a soil rollover event, and an embankment rollover event. The controller is also configured to select a deployment threshold for deploying the actuatable restraint. The deployment threshold corresponds to the classification of the vehicle rollover event.

According to one aspect, the at least one classification metric can include a classification metric that evaluates vehicle roll acceleration (D_RATE) vs. vehicle roll angle (R_ANGLE).

According to another aspect, alone or in combination with any other aspect, the at least one classification metric can include a classification metric that evaluates vehicle roll acceleration (D_RATE) vs. vehicle roll angle (R_ANGLE).

The controller can be configured to execute the classification metric that evaluates vehicle roll acceleration (D_RATE) vs. vehicle roll angle (R_ANGLE) to discriminate a ramp rollover event from an embankment rollover event.

According to another aspect, alone or in combination with any other aspect, the at least one classification metric can include a classification metric that evaluates vehicle pitch rate (P_RATE) vs. vehicle roll angle (R_ANGLE). The controller can be configured to execute the classification metric that evaluates vehicle pitch rate (P_RATE) vs. vehicle roll angle (R_ANGLE) to discriminate a ramp rollover event from an embankment rollover event.

According to another aspect, alone or in combination with any other aspect, the at least one classification metric can also include a classification metric that evaluates vehicle lateral acceleration moving average (CCU_1Y_AMA) vs. vehicle roll angle (R_ANGLE). The controller can be configured to execute the classification metric that evaluates vehicle lateral acceleration moving average (CCU_1Y_AMA) vs. vehicle roll angle (R_ANGLE) to verify the discrimination of a ramp rollover event from an embankment rollover event.

According to another aspect, alone or in combination with any other aspect, the at least one classification metric can include a classification metric that evaluates vehicle vertical acceleration moving average (CCU_6Z_AMA) vs the vehicle roll angle (R_ANGLE). The controller can be configured to execute the classification metric that evaluates vehicle vertical acceleration moving average (CCU_6Z_AMA) vs the vehicle roll angle (R_ANGLE) to verify the discrimination of a ramp rollover event from an embankment rollover event.

According to another aspect, alone or in combination with any other aspect, the at least one classification metric can include a classification metric that evaluates vehicle roll acceleration (D_RATE) vs. vehicle roll angle (R_ANGLE). The controller can be configured to execute the classification metric that evaluates vehicle roll acceleration (D_RATE) vs. vehicle roll angle (R_ANGLE) to discriminate a soil rollover event from an embankment rollover event.

According to another aspect, alone or in combination with any other aspect, the discrimination algorithm can include a classification metric that evaluates vehicle roll acceleration (D_RATE) vs. vehicle roll rate (R_RATE_2). The controller can be configured to execute the classification metric that evaluates vehicle roll acceleration (D_RATE) vs. vehicle roll rate (R_RATE_2) to discriminate a soil rollover event from an embankment rollover event.

According to another aspect, alone or in combination with any other aspect, the controller can be is configured to execute the classification metric that evaluates vehicle roll acceleration (D_RATE) vs. vehicle roll rate (R_RATE_2) to discriminate between a hard soil rollover event, a mid-soil rollover event, and a soft soil rollover event.

According to another aspect, alone or in combination with any other aspect, the at least one classification metric can include a classification metric that evaluates vehicle lateral acceleration moving average (CCU_1Y_AMA) vs. vehicle roll angle (R_ANGLE). The controller can be configured to execute the classification metric that evaluates vehicle lateral acceleration moving average (CCU_1 Y_AMA) vs. vehicle roll angle (R_ANGLE) to discriminate a soil rollover event from an embankment rollover event.

According to another aspect, alone or in combination with any other aspect, the at least one classification metric can include a classification metric that evaluates vehicle vertical acceleration moving average (CCU_6Z_AMA) vs the vehicle roll angle (R_ANGLE). The controller can be configured to execute the classification metric that evaluates vehicle vertical acceleration moving average (CCU_6Z_AMA) vs the vehicle roll angle (R_ANGLE) to verify the discrimination of a soil rollover event from an embankment rollover event.

According to another aspect, alone or in combination with any other aspect, the controller can be configured to execute deployment threshold metrics for determining whether to actuate the actuatable restraint. The deployment threshold metrics evaluate vehicle roll acceleration (D_RATE) vs. vehicle roll angle (R_ANGLE), and wherein the controller is configured to deploy the actuatable restraint in response to the deployment threshold metrics exceeding the deployment threshold.

According to another aspect, alone or in combination with any other aspect, the system can also include an accelerometer for sensing vehicle lateral acceleration and providing a signal indicative of sensed vehicle lateral acceleration (CCU_1Y). The system can also include an accelerometer for sensing vehicle vertical acceleration and providing a signal indicative of sensed vehicle vertical acceleration (CCU_6Z). The system can further include a roll rate sensor for sensing vehicle roll rate values and providing a signal indicative of sensed vehicle roll rate values (CCU_4R).

According to another aspect, alone or in combination with any other aspect, the controller is configured to execute vehicle metric calculations to:
Determine vehicle lateral acceleration moving average (CCU_1Y_AMA) from the signal indicative of sensed vehicle lateral acceleration (CCU_1Y).
Determine vehicle vertical acceleration moving average (CCU_6Z_AMA) from the signal indicative of sensed vehicle vertical acceleration (CCU_6Z).
Determine vehicle roll acceleration (D_RATE) from the signal indicative of sensed vehicle roll rate values (CCU_4R).
Determine vehicle roll angle (R_ANGLE) from the signal indicative of sensed vehicle roll rate values (CCU_4R).

According to another aspect, alone or in combination with any other aspect, the system can also include a pitch rate sensor for sensing vehicle pitch rate values and providing a signal indicative of sensed vehicle pitch rate (CCU_5P). The controller can be configured to execute vehicle metric calculations to determine vehicle pitch rate (P_RATE) from the signal indicative of sensed vehicle pitch rate (CCU_5P).

According to another aspect, alone or in combination with any other aspect, the actuatable restraints can include at least one of seatbelt anchor pretensioners, seatbelt retractor pretensioners, curtain airbags, thorax airbags, side airbags, emergency notifications, door unlock commands, and high-voltage powertrain cutoff commands.

According to another aspect, alone or in combination with any other aspect, the controller can be configured to issue at least one of emergency notifications, door unlock commands, and high-voltage powertrain cutoff commands in response to actuating the actuatable restraints.

DRAWINGS

The foregoing and other features and advantages of the invention will become apparent to one skilled in the art upon consideration of the following description of the invention and the accompanying drawings in which.

DESCRIPTION

The invention relates to a vehicle safety system that implements an enhanced discrimination algorithm that can discriminate between and classify ramp and embankment rollover crash events. The enhanced discrimination algorithm implemented by the vehicle safety system can also discriminate between and classify an embankment event from a tripping event. The enhanced discrimination algorithm implemented by the vehicle safety system can further discriminate between and classify a hard soil, mid-soil, and soft soil tripping event.

Because the invention is related to the enhanced discrimination of those events mentioned in the preceding paragraph, the vehicle safety system is shown and described herein as including the components and implementing the algorithms necessary to perform these particular enhanced discrimination functions. Those skilled in the art will appreciate that the vehicle safety system can include components in addition to those shown and described herein and can perform discrimination algorithms in addition to those shown and described herein.

Figure 1:
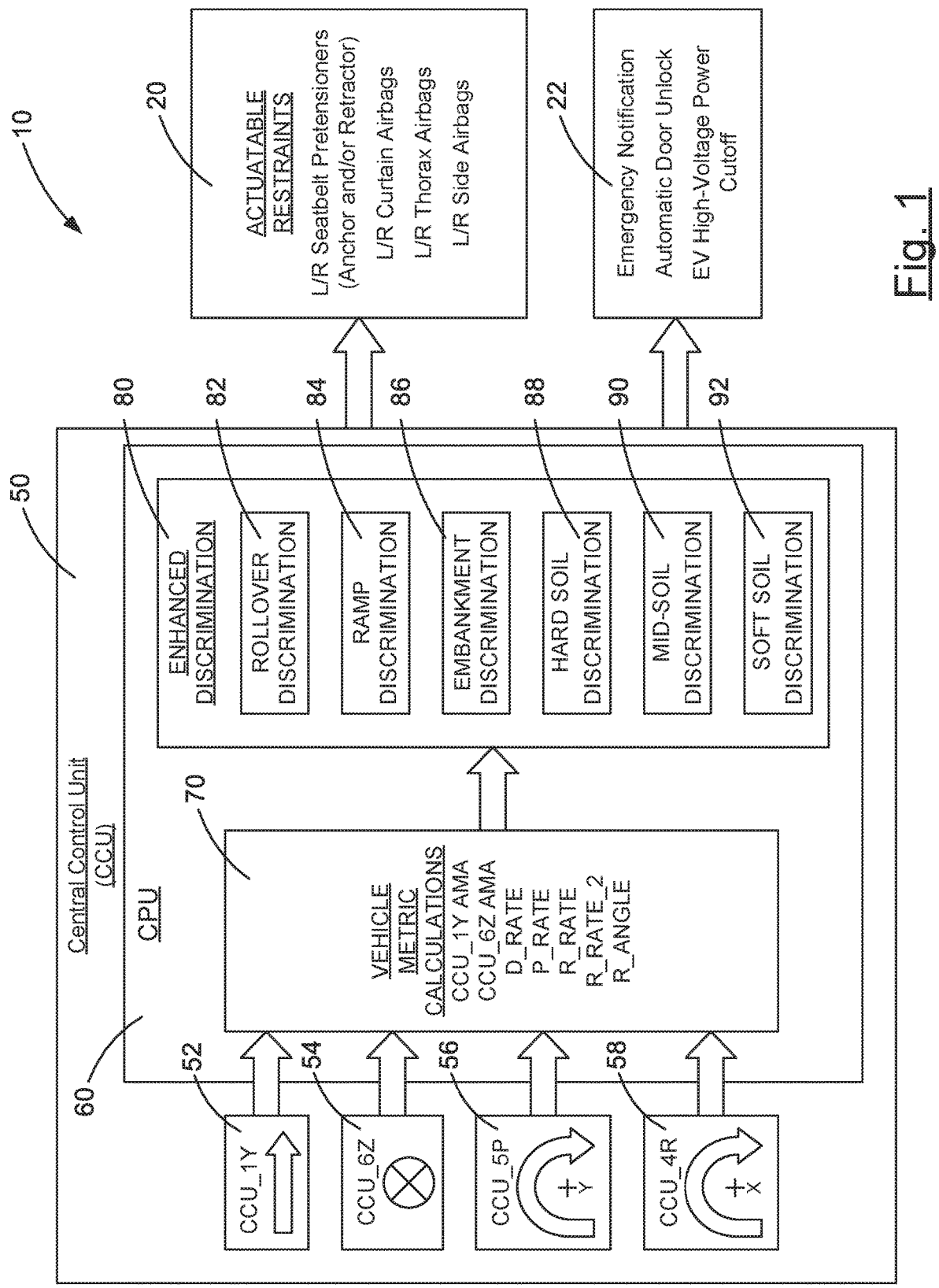
FIG. 1 is a block diagram illustrating a vehicle safety system.

Referring to FIG. 1, according to one example configuration, a vehicle safety system 10 includes a central control unit (CCU) 50 that is operative to actuate one or more actuatable restraints 20, such as left/right seatbelt pretensioners (anchor and/or retractor), left/right curtain airbags, left/right thorax airbags, and left/right side airbags. The CCU 50 can also be operative to control actuation of other protection devices, such as frontal airbags and knee airbags.

The CCU 50 can also be operative to control other vehicle safety features 22, such as emergency notifications, automatic door unlock commands, and electric vehicle (EV) high-voltage power cutoff commands. Emergency notifications can, for example, include notifications or requests for emergency response (fire/EMS) issued via vehicle-based emergency assistance systems, such as GM Onstar®, Ford SYNC®, and Chrysler Uconnect®. For electric vehicles, the high-voltage cutoff command can de-couple the vehicle battery from the vehicle electrical system in order to reduce the risk of shock or fire due to electrical shorts or faults.

The CCU 50 includes one or more sensors that are operative to provide signals indicative of vehicle linear and/or angular accelerations and/or rates of movement in different directions and with respect to different vehicle axes. The sensors can be mounted locally in or on the CCU 50 itself or can be remote from the CCU and interconnected, e.g., via wire, to the CCU. These vehicle axes include an X-axis, which extends longitudinally in the vehicle in the direction of forward/rearward vehicle travel. A vehicle Y-axis extends laterally in the vehicle, perpendicular to the X-axis. A vehicle Z-axis extends vertically in the vehicle, perpendicular to both the X-axis and the Y-axis. The X, Y, and Z axes can be said to intersect at the vehicle center of mass.

The CCU 50 includes an accelerometer 52 for sensing vehicle lateral (Y-axis) acceleration (CCU_1 Y). The CCU 50 also includes an accelerometer 54 for sensing vehicle vertical (Z-axis) acceleration (CCU_6Z). The CCU 50 also includes a pitch rate sensor 56 for sensing vehicle pitch rate values (CCU_5P), i.e., pitch rate about the vehicle Y-axis. The CCU 50 further includes a roll rate sensor 58 for sensing vehicle roll rate values (CCU_4R), i.e., roll rate about the vehicle X-axis. It can be desirable to position the sensors on or near the respective axes along or about which they sense vehicle motion. Since the sensors can be mounted locally on the CCU 50, it can be desirable to mount the CCU at or near the vehicle center of mass.

Hardware and software configurations for CCUs implemented in vehicle safety systems are known in the art. Therefore, a detailed description of the hardware configuration of the CCU 50 is not necessary for one having ordinary skill in the art to understand and appreciate the vehicle safety system 10. The CCU 50 of FIG. 1 includes a central processing unit (CPU) 60, such as a microcomputer, that is configured to receive the signals CCU_1Y, CCU_6Z, CCU_4R, and CCU_5P from their respective sensors, to perform vehicle metric calculations 70 on those signals, and to perform enhanced discrimination algorithms 80 utilizing the calculated metrics.

The vehicle metrics resulting from the calculations 62 include:

Vehicle lateral Y-axis acceleration moving average (CCU_1Y_AMA).

Vehicle vertical Z-axis acceleration moving average (CCU_6Z_AMA).

Vehicle roll difference rate, i.e., roll acceleration, (D_RATE).

Vehicle pitch rate (P_RATE).

Vehicle roll rate (R_RATE), and a vehicle roll angle (R_ANGLE).

The enhanced discrimination algorithms 80 include a rollover discrimination algorithm 82, a ramp/embankment discrimination algorithm 84, and a hard soil/mid-soil/soft soil discrimination algorithm 86. The CCU 50 is configured to perform the vehicle metric calculations 70 and the enhanced discrimination algorithms 80, and determine which, if any, of the actuatable restraints 20 to actuate.

Figure 2:
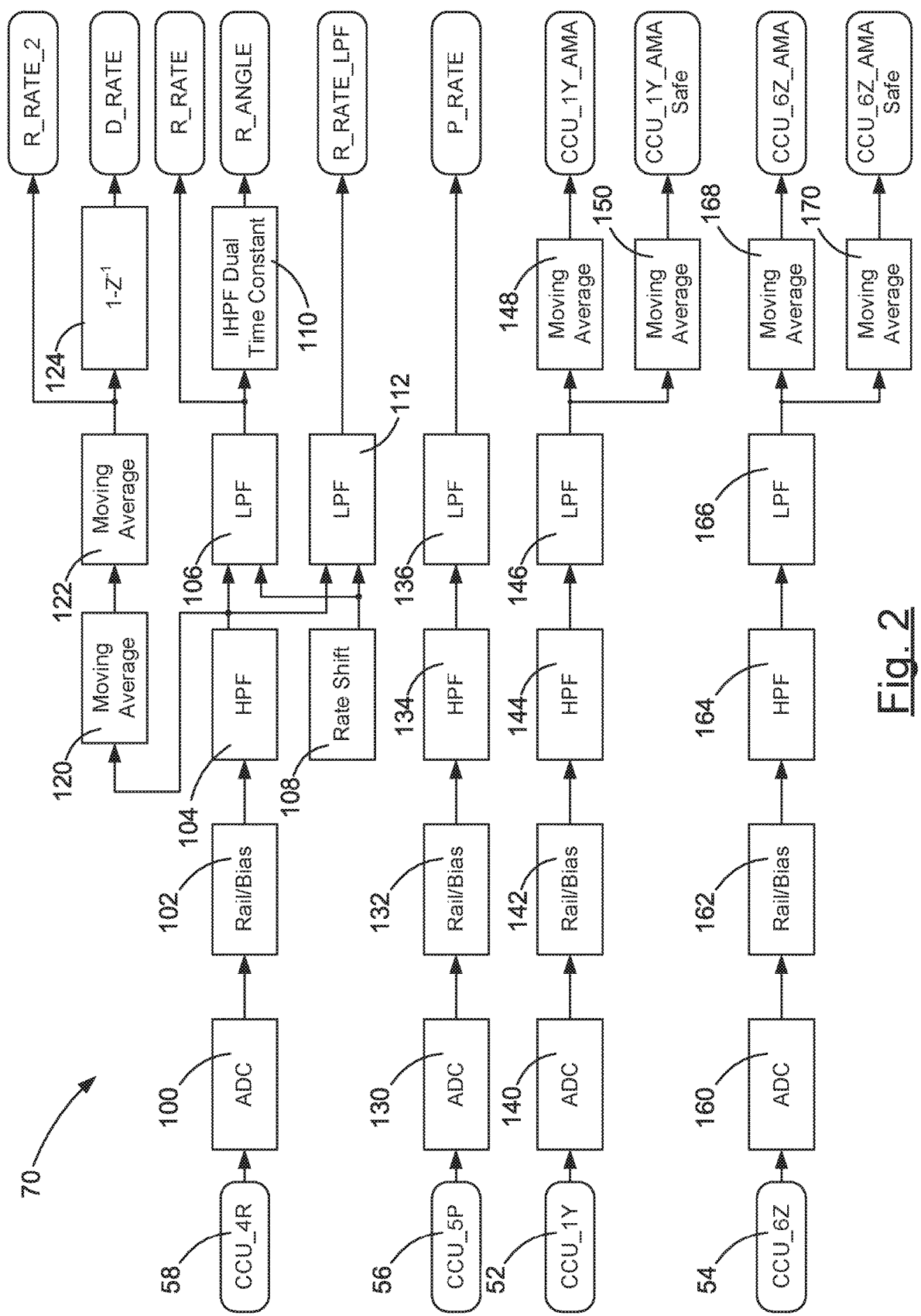
FIG. 2 is a block diagram illustrating metric calculations implemented in the vehicle safety system.

FIG. 2 illustrates the vehicle metric calculations 70 performed by the CCU 50. The elements of the vehicle metric calculations 70 shown in FIG. 2, referred to herein as "functions" performed internally by the CCU 50.

Roll Rate Metrics

According to the vehicle metric calculations 70, analog to digital converter (ADC) function 100 converts the roll rate CCU_4R signal to a digital signal. The ADC 100 can, for example, can implement a 10-bit 8 sample summation @ 125 μs. At Rail/Bias function 102, rail checking and bias adjustments are performed, for example, at 1 ms. The digitized and biased roll rate CCU_4R is passed to high-pass filter (HPF) function 104 that, for example, can be selected to have a time constant which results in resetting the filter function after a predetermined time period, e.g., T=8 seconds. The high-pass filtered roll rate CCU_4R produced at HPF function 104 is passed to low-pass filter (LPF) function 106, which has a variable corner frequency, also known as a cutoff frequency, as determined by rate shift function 108. For example, at rate shift function 108, the corner/cutoff frequency is selected from the following:

| Rate_LPF_Shift | Corner/Cutoff Frequency |
|---|---|
| 3 | 21.25 Hz |
| 4 | 10.27 Hz |
| 5 | 5.05 Hz |

LPF function 106 produces the roll rate metric R_RATE, which has a value indicative of vehicle roll rate (i.e., angular velocity), that is implemented in the enhanced discrimination algorithms 80 (see, FIG. 1). R_RATE is passed to integrating high-pass filter (IHPF) function 110, which includes an integrator function and a dual time constant high-pass filter function. The IHPF function 110 integrates the R_RATE signal to produce a value indicative of a determined relative roll angle of the vehicle. The IHPF function 110 also performs high-pass filtering of the R_RATE signal. The IHPF function 110 produces the metric R_ANGLE, which is implemented in the enhanced discrimination algorithms 80 (see, FIG. 1).

R_ANGLE is indicative of a normalized roll angle of the vehicle, which is a measure of relative angular rotation of the vehicle in response to a sensed roll rate. IHPF function 110 can reset the R_ANGLE based on a time constant for the high-pass filter function so that R_ANGLE provides an indication of angular rotation during the occurrence of a detected roll rate. R_ANGLE therefore may not indicate the actual angular orientation of the vehicle relative to the ground. In this way, the determination of a vehicle rollover condition need not depend on a determination of an initial angular orientation of the vehicle relative to the ground or road.

The high-pass filtered roll rate CCU_4R produced at HPF function 104 is also passed to low-pass filter (LPF) function 112, which is also a variable corner/cutoff frequency LPF, as determined by rate shift function 108 (see above table). LPF function 112 produces the roll rate metric R_RATE_LPF, which has a value indicative of vehicle roll rate (i.e., angular velocity). R_RATE_LPF is implemented in the enhanced discrimination algorithms 80 (see, FIG. 1). R_RATE_LPF can be considered a band-pass filtered roll rate value since it is the product of both high-pass and low-pass filtering.

The high-pass filtered roll rate CCU_4R produced at HPF function 104 is also passed to moving average function 120 and then to moving average function 122. Each moving average function 120, 122 can, for example, be tunable to select the number of samples, e.g., 1-32 samples. The moving average functions 120, 122 smooth the variations in the roll rate, producing the metric R_RATE_2, which is implemented in the enhanced discrimination algorithms 80 (see, FIG. 1).

R_RATE_2 provided to difference function 124 where the difference between the current sample and the previous sample are compared. This produces differenced roll rate metric D_RATE, which is indicative of a rate of change, i.e., acceleration, of the roll rate. This roll acceleration D_RATE is the angular acceleration of the vehicle about the vehicle X-axis. The roll acceleration D_RATE is implemented in the enhanced discrimination algorithms 80 (see, FIG. 1).

Pitch Rate Metrics

According to the vehicle metric calculations 70, analog to digital converter (ADC) function 130 converts the pitch rate CCU_5P signal to a digital signal. The ADC 130 can, for example, can implement a 10-bit 8 sample summation @ 125 μs. At Rail/Bias function 132, rail checking and bias adjustments are performed, for example, at 1 ms. The digitized and biased pitch rate CCU_5P is passed to high-pass filter (HPF) function 134 that, for example, can be selected to have a time constant which results in resetting the filter function after a predetermined time period, e.g., T=8 seconds. The high-pass filtered pitch rate CCU_5PR produced at HPF function 134 is passed to low-pass filter (LPF) function 136. LPF function 136 produces the pitch rate metric P_RATE, which has a value indicative of vehicle pitch rate (i.e., angular velocity), that is implemented in the enhanced discrimination algorithms 80 (see, FIG. 1).

Lateral Acceleration Metrics

According to the vehicle metric calculations 70, analog to digital converter (ADC) function 140 converts the lateral (Y-axis) acceleration CCU_1Y signal. The ADC 140 can, for example, can implement a 10-bit 8 sample summation @ 125 μs. At Rail/Bias function 142, rail checking and bias adjustments are performed, for example, at 1 ms. The digitized and biased lateral acceleration CCU_1Y is passed to high-pass filter (HPF) function 144 that, for example, can be selected to have a time constant which results in resetting the filter function after a predetermined time period, e.g., T=8 seconds. The high-pass filtered lateral acceleration CCU_1Y produces at HPF function 144 is passed to low-pass filter (LPF) function 146. The low-pass filtered lateral acceleration CCU_1Y value produced at LPF function 146 is passed to moving average blocks 148 and 150, which produce the lateral acceleration metrics CCU_1 Y_AMA and CCU_1Y_AMA_SAFE metrics. The number of samples include in each of the moving average functions 148, 150 can be tuned within a predetermined range, such as 1-32 samples. CCU_1 Y_AMA and CCU_1 Y_AMA_SAFE are lateral acceleration moving average values that are implemented in the enhanced discrimination algorithms 80 (see, FIG. 1).

Vertical Acceleration Metrics

According to the vehicle metric calculations 70, analog to digital converter (ADC) function 160 converts the vertical (Z-axis) acceleration CCU_6Z signal. The ADC 140 can, for example, can implement a 10-bit 8 sample summation @ 125 μs. At Rail/Bias function 162, rail checking and bias adjustments are performed, for example, at 1 ms. The digitized and biased vertical acceleration CCU_6Z is passed to high-pass filter (HPF) function 164 that, for example, can be selected to have a time constant which results in resetting the filter function after a predetermined time period, e.g., T=8 seconds. The high-pass filtered lateral acceleration CCU_6Z produces at HPF function 164 is passed to low-pass filter (LPF) function 166. The low-pass filtered lateral acceleration CCU_6Z value produced at LPF function 166 is passed to moving average blocks 168 and 170, which produce the lateral acceleration metrics CCU_6Z_AMA and CCU_6Z_AMA_SAFE metrics. The number of samples include in each of the moving average functions 168, 150 can be tuned within a predetermined range, such as 1-32 samples. CCU_6Z_AMA and CCU_6Z_AMA_SAFE are lateral acceleration moving average values that are implemented in the enhanced discrimination algorithms 80 (see, FIG. 1).

Roll Thresholds

Figure 3:
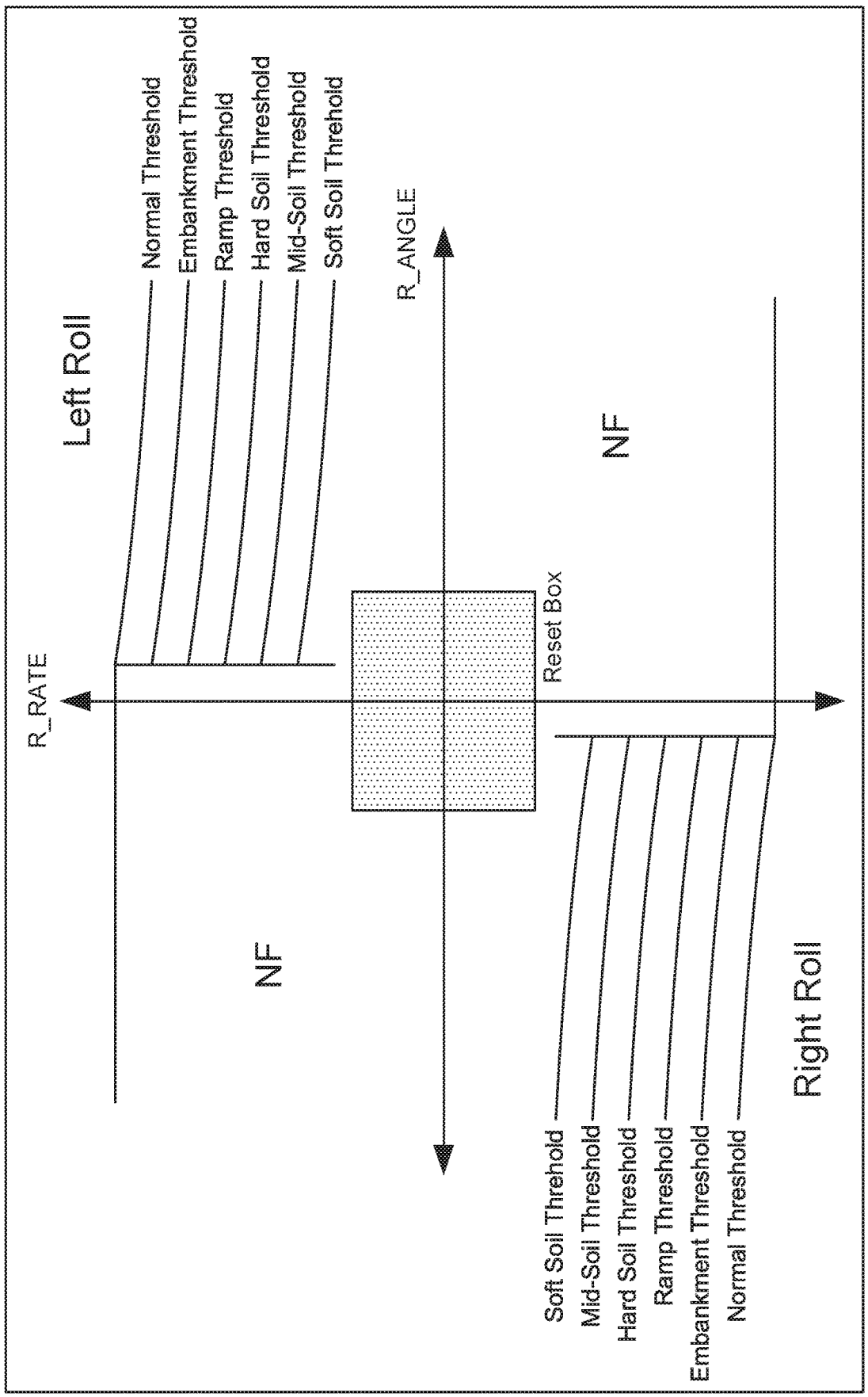
FIG. 3 is a diagram illustrating an deployment threshold metrics for determining the occurrence of a vehicle roll for different surface conditions.

The ability to discriminate amongst various types of rollover events allows for the tailoring of the thresholds that trigger deployment of the actuatable restraints 20 (see FIG. 1). These thresholds are illustrated in FIG. 3, which illustrates deployment threshold metrics for actuating the actuatable restraints based on the thresholds for different rollover event classifications. As shown in FIG. 3, the deployment threshold metrics are based on a comparison of R_RATE and R_ANGLE. The threshold determination of FIG. 3 illustrates left roll (i.e., roll toward the driver side) as being indicated by R_RATE and R_ANGLE values in one direction (e.g., positive) and right roll (i.e., roll toward the passenger side) as being indicated by values for R_RATE and R_ANGLE in the opposite direction (e.g., negative).

As shown in FIG. 3, a soft soil rollover event classification has the lowest threshold for triggering deployment of the actuatable restraints. A mid-soil condition has the next lowest rollover event classification threshold for triggering actuatable restraint deployment, followed by hard soil, ramp, and embankment. A normal condition, i.e., none of the other thresholds are classified, results in the highest deployment trigger threshold. These deployment threshold triggers can be latched, in which case the latch can be reset when the metric enters the reset box shown in FIG. 3.

Also, as shown, the trigger thresholds can require some threshold R_ANGLE is detected, as indicated by the vertical lines, i.e., on the left of the left roll thresholds and on the right of the right side thresholds. Once the requisite R_ANGLE is met, the thresholds are substantially flat, meaning that roll rate (R_RATE) is highly determinative of which, if any, of the thresholds are met.

Enhanced Discrimination Algorithms

According to the invention, enhanced discrimination algorithms utilize the vehicle metrics determined in FIG. 2 to discriminate and classify vehicle rollover events so that the correct rollover thresholds (FIG. 3) are used to determine whether to actuate the actuatable restraints. The rollover events can be classified as ramp, embankment, or soil (hard, mid, soft) events. By "discriminating," it is meant that the classification of the vehicle rollover event not only identifies the type of rollover event that has taken place, but also that the event is not one of the other event(s) amongst which the algorithm is configured to discriminate. Thus, for example, where the enhanced discrimination algorithm is configured to discriminate between a ramp and an embankment rollover event, classifying the event as a ramp rollover event also means that the event is not an embankment rollover event.

Ramp events are those where the vehicle engages an inclined surface that produces vehicle roll/rollover. Embankment events are those where the vehicle engages a declined surface that produces vehicle roll/rollover. Soil events are those where the vehicle moves laterally onto soil, which produces vehicle roll/rollover. Soil events can be hard, mid, or soft. Soft soil is just that—soft soil, such as normal grass/turf that offers low resistance to further lateral vehicle movement. Hard soil is classified as hard packed soil, gravel, rocks, curbs, or other road level obstructions that produce a "tripping" of the vehicle, where the road-contacting region of the tire/wheels is grabbed or otherwise stopped with high resistance to further lateral vehicle movement. Mid-soil is classified as offering a level or resistance to lateral vehicle movement between that of hard and soft soil events.

In discriminating amongst various vehicle rollover events, it can be difficult to separate ramp events (e.g., a left ramp and a right embankment) from embankment events (e.g., a left ramp and a right embankment) because they exhibit similar characteristics. It can also be difficult to separate soil events from embankment events because they too develop in a similar manner. In order words, the embankment is easy to mix with the ramp and soil events. The enhanced discrimination algorithms 80 implemented in the vehicle safety system 10 utilize pitch rate P_RATE and roll acceleration D_RATE to enhance the classification of these events. In this description this improved classification can be referred to as improving the separation of these events. This is because classification metrics implemented in the enhanced discrimination algorithms have been developed so that their values differ to an extent sufficient to discriminate between the events.

The ramp and embankment rollover events are slow to develop. The vehicle moves upward during the ramp rollover while the vehicle move downward during the embankment rollover. Physically, the vertical acceleration of the vehicle is able to distinguish the ramp and embankment. The vertical acceleration during an embankment event, however, is not significant. Because of this it can be difficult to discriminate an embankment event from ramp or soil events using vertical acceleration as the determining factor. Advantageously, the enhanced discrimination algorithms 80 utilize the vehicle metrics determined in FIG. 2 to enhance the classification of ramp and embankment.

The enhanced discrimination algorithms implement what are referred to as classification metrics to discriminate amongst the various rollover events. The classification metrics are comparisons of two of the vehicle metrics (see FIG. 2), i.e., metric A vs. metric B, which can be illustrated by a graph or plot. While illustrated graphically, it will be appreciated that the classification metrics can be calculated in the CPU 60 via mathematical operation.

Ramp and Embankment Events

A ramp event is one in which a rollover results from one side of the vehicle travelling up a structure that acts as a ramp for that side of the vehicle. This can occur, for example, when one side of a vehicle is lifted by a concrete highway lane barrier. An embankment event is one in which a rollover results from one side of the vehicle travelling down an embankment on the side of the road. Comparing left vehicle rollover events, for example, a left ramp rollover event results from the right side of the vehicle moving/accelerating upward along the ramp structure, producing a left roll about the vehicle longitudinal, X-axis. A left embankment rollover event results from the left side of the vehicle moving/accelerating downward along the embankment structure, producing a left roll about the vehicle longitudinal, X-axis. For purposes of providing enhanced occupant protection, it can be advantageous to discriminate a ramp event from an embankment event.

Ramp Discrimination

Figure 4:
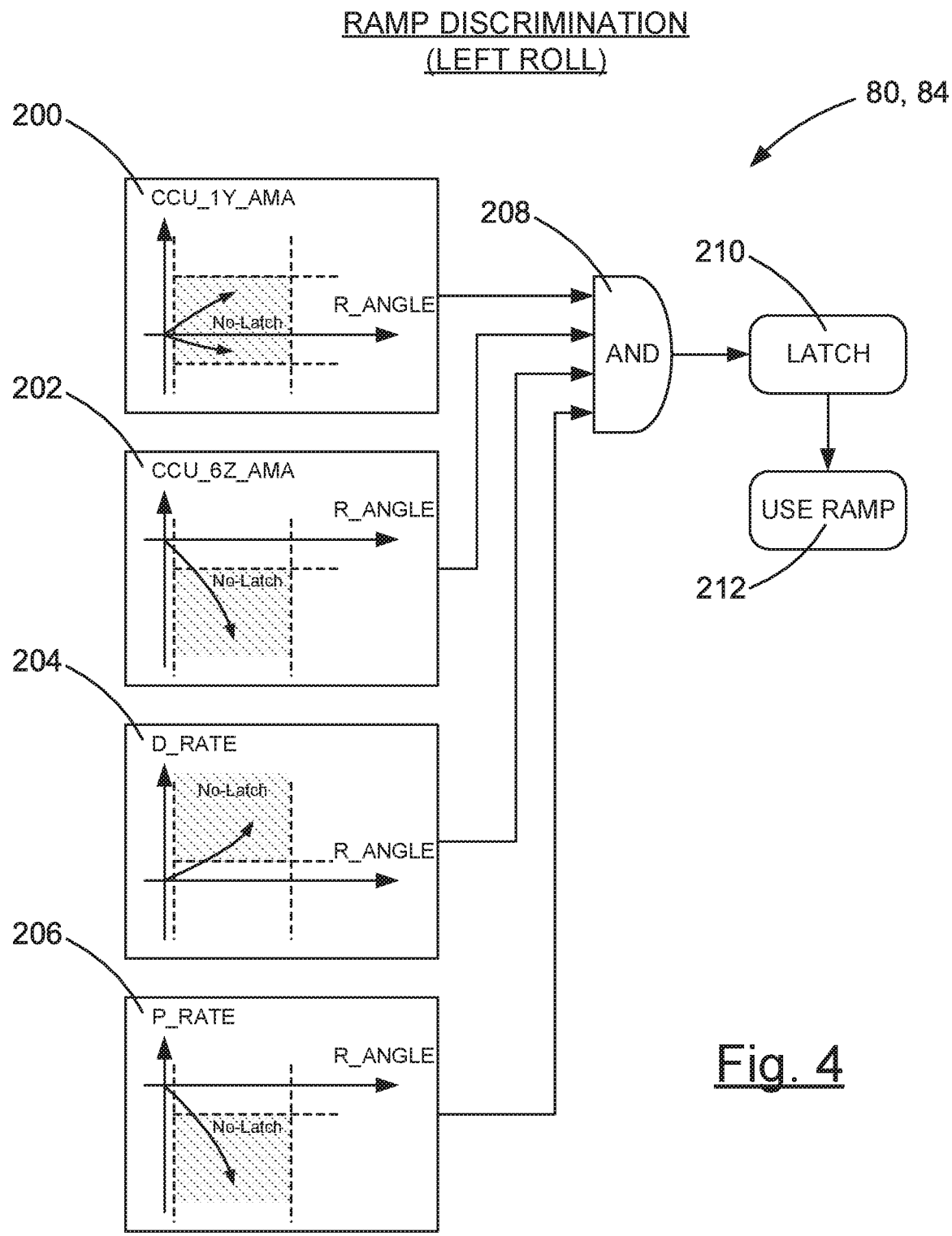
FIG. 4 is a schematic block diagram illustrating a ramp discrimination algorithm implemented by the vehicle safety system.

A ramp discrimination algorithm 84 is shown in FIG. 4. The ramp discrimination algorithm 84 is used to determine whether to use the ramp thresholds (see FIG. 3) when deploying the actuatable restraints. The ramp discrimination algorithm 84 of FIG. 4 is shown for left roll events, i.e., the vehicle rolling to the left or driver side. It should, however, be appreciated that the algorithms shown in FIG. 4 also apply to right roll events, the only difference being sign (+/−) of the values used in the classification metrics is opposite. In other words, the classification metrics for right roll events would be identical to those shown in FIG. 4, except that the sign of the respective axes for the different metric values within the classification metrics would be opposite, e.g., negative instead of positive and vice versa.

The ramp discrimination algorithm 84 implements four different classification metrics to discriminate a ramp event. The four classification metrics are:
CCU_1Y_AMA vs. R_ANGLE
CCU_6Z vs. R_ANGLE
D_RATE vs. R_ANGLE
P_RATE vs. R_ANGLE A USE RAMP THRESHOLD determination is made at block 212 in response to all of the classification metrics 200, 202, 204, 206 fed into AND block 208 being satisfied, i.e., a Boolean one, referred to herein as ON. The USE RAMP THRESHOLD determination 212 can be a latched determination, as shown at LATCH block 210. Therefore, once AND block 208 is satisfied, USE RAMP THRESHOLD 212 is ON and remains ON due to LATCH 210, even after the classification metrics fed into AND block 208 cease to be ON. The classification metrics 200, 202, 204, 206 fed into AND block 208 are described in the following paragraphs.

A lateral acceleration vs. roll angle classification metric 200 utilizes CCU_1Y_AMA and R_ANGLE to produce an output, which is fed to AND block 208. As shown, the lateral acceleration vs. roll angle classification metric 200 is ON when the metric is in the shaded trigger zone bounded by the dashed lines. The solid line in the lateral acceleration vs. roll angle classification metric 200 is representative of the metric when the vehicle is undergoing a ramp rollover event. The lateral acceleration vs. roll angle classification metric 200 is a no-latch metric, that is, the metric is ON only when the metric is in the trigger zone. Testing has shown that the lateral acceleration vs. roll angle classification metric 200 does not produce separation sufficient to reliably discriminate between the ramp and embankment events. Therefore, the lateral acceleration vs. roll angle classification metric 200 is utilized in the ramp discrimination algorithm 84 as confirmation (at AND block 208) when the other classification metrics 202, 204, 206 are in agreement on discriminating the occurrence of a ramp event.

A vertical acceleration vs. roll angle classification metric 202 utilizes CCU_6Z_AMA and R_ANGLE to produce an output, which is fed to AND block 208. As shown, the vertical acceleration vs. roll angle classification metric 202 is ON when the metric is in the shaded trigger zone bounded by the dashed lines. The solid line in the vertical acceleration vs. roll angle classification metric 202 is representative of the metric when the vehicle is undergoing a ramp rollover event. The vertical acceleration vs. roll angle classification metric 202 is a no-latch metric, that is, the metric is ON only when the metric is in the trigger zone. Testing has shown that the vertical acceleration vs. roll angle classification metric 202 does not produce separation sufficient to reliably discriminate between the ramp and embankment events. Therefore, the vertical acceleration vs. roll angle classification metric 202 is utilized in the ramp discrimination algorithm 84 as confirmation (at AND block 208) when the other classification metrics 200, 204, 206 are in agreement on discriminating the occurrence of a ramp event.

An angular or roll acceleration vs. roll angle classification metric 204 utilizes D_RATE and R_ANGLE to produce an output, which is fed to AND block 208. As shown, the roll acceleration vs. roll angle classification metric 204 is ON when the metric is in the shaded trigger zone bounded by the dashed lines. The solid line in the roll acceleration vs. roll angle classification metric 204 is representative of the metric when the vehicle is undergoing a ramp rollover event. The roll acceleration vs. roll angle classification metric 204 is a non-latch metric, that is, the metric is ON only when the metric is in the trigger zone. Testing has shown that comparing roll acceleration vs. roll angle produces a reliable discrimination of a ramp event from an embankment event. This is because the roll acceleration vs. roll angle classification metric 204 produces a degree of separation in the metric values that is adequate to reliably discriminate between the ramp and embankment events. The roll acceleration vs. roll angle classification metric 204 therefore is utilized in the ramp discrimination algorithm 84 as a positive discrimination of a ramp event.

A pitch rate vs. roll angle classification metric 206 utilizes P_RATE and R_ANGLE to produce an output, which is fed to AND block 208. As shown, the pitch rate vs. roll angle classification metric 206 is ON when the metric is in the shaded trigger zone bounded by the dashed lines. The solid line in the pitch rate vs. roll angle classification metric 206 is representative of the metric when the vehicle is undergoing a ramp rollover event. The pitch rate vs. roll angle classification metric 206 is a no-latch metric, that is, the metric is ON only when the metric is in the trigger zone. Testing has shown that comparing pitch rate vs. roll angle produces a reliable discrimination of a ramp event from an embankment event. This is because the pitch rate vs. roll angle classification metric 206 produces a degree of separation in the metric values that is adequate to reliably discriminate between the ramp and embankment events. The pitch rate vs. roll angle classification metric 206 therefore is utilized in the ramp discrimination algorithm 84 as a positive discrimination of a ramp event.

Embankment Discrimination

Figure 5:
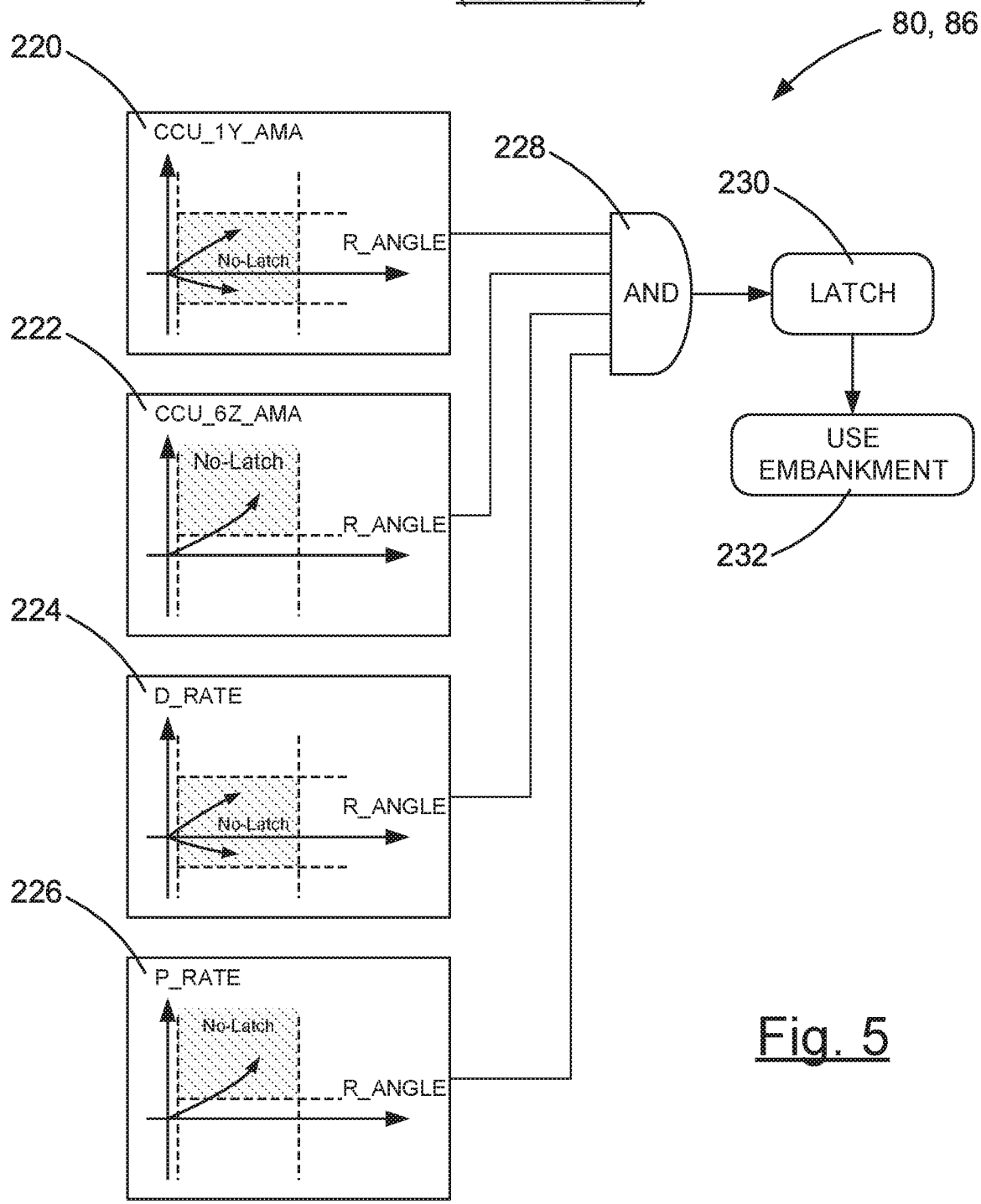
FIG. 5 is a schematic block diagram illustrating an embankment discrimination algorithm implemented by the vehicle safety system.

An embankment discrimination algorithm 86 is shown in FIG. 5. The embankment discrimination algorithm 86 is used to determine whether to use the embankment thresholds (see FIG. 3) when deploying the actuatable restraints. The embankment discrimination algorithm 86 of FIG. 5 is shown for left roll events, i.e., the vehicle rolling to the left or driver side. It should, however, be appreciated that the algorithms shown in FIG. 5 also apply to right roll events, the only difference being sign (+/−) of the values used in the metrics is opposite. In other words, the metrics for right roll events would be identical to those shown in FIG. 5, except that the sign of the respective axes for the different metric values would be opposite, e.g., negative instead of positive and vice versa.

The embankment discrimination algorithm 86 implements four different metrics to discriminate a ramp event. The four metrics are:
CCU_1Y_AMA vs. R_ANGLE
CCU_6Z vs. R_ANGLE
D_RATE vs. R_ANGLE
P_RATE vs. R_ANGLE A USE EMBANKMENT THRESHOLD determination is made at block 232 in response to all of the classification metrics 220, 222, 224, 226 fed into AND block 228 being satisfied, i.e., a Boolean one, referred to herein as ON. The USE EMBANKMENT THRESHOLD determination 232 can be a latched determination, as shown at LATCH block 230. Therefore, once AND block 228 is satisfied, USE EMBANKMENT THRESHOLD 232 is ON and remains ON due to LATCH 230, even after the metrics fed into AND block 228 cease to be ON. The classification metrics 220, 222, 224, 226 fed into AND block 228 are described in the following paragraphs.

A lateral acceleration vs. roll angle classification metric 220 utilizes CCU_1Y_AMA and R_ANGLE to produce an output, which is fed to AND block 228. As shown, the lateral acceleration vs. roll angle classification metric 220 is ON when the metric is in the shaded trigger zone bounded by the dashed lines. The solid line in the lateral acceleration vs. roll angle classification metric 220 is representative of the metric when the vehicle is undergoing an embankment rollover event. The lateral acceleration vs. roll angle classification metric 220 is a no-latch metric, that is, the metric is ON only when the metric is in the trigger zone. Testing has shown that the lateral acceleration vs. roll angle classification metric 220 does not produce separation sufficient to reliably discriminate between the ramp and embankment events. Therefore, the lateral acceleration vs. roll angle classification metric 220 is utilized in the embankment discrimination algorithm 86 as confirmation (at AND block 228) when the other classification metrics 222, 224, 226 are in agreement on discriminating the occurrence of an embankment event.

A vertical acceleration vs. roll angle classification metric 222 utilizes CCU_6ZY_AMA and R_ANGLE to produce an output, which is fed to AND block 228. As shown, the vertical acceleration vs. roll angle classification metric 222 is ON when the metric is in the shaded trigger zone bounded by the dashed lines. The solid line in the vertical acceleration vs. roll angle classification metric 222 is representative of the metric when the vehicle is undergoing an embankment rollover event. The vertical acceleration vs. roll angle classification metric 222 is a no-latch metric, that is, the metric is ON only when the metric is in the trigger zone. Testing has shown the vertical acceleration vs. roll angle classification metric 222 does not produce separation sufficient to reliably discriminate between the ramp and embankment events. Therefore, the vertical acceleration vs. roll angle classification metric 222 is utilized in the embankment discrimination algorithm 86 as confirmation (at AND block 228) when the other classification metrics 220, 224, 226 are in agreement on discriminating the occurrence of an embankment event.

An angular or roll acceleration vs. roll angle classification metric 224 utilizes D_RATE and R_ANGLE to produce an output, which is fed to AND block 228. As shown, the roll acceleration vs. roll angle classification metric 224 is ON when the metric is in the shaded trigger zone bounded by the dashed lines. The solid line in the roll acceleration vs. roll angle classification metric 224 is representative of the metric when the vehicle is undergoing an embankment rollover event. The roll acceleration vs. roll angle classification metric 224 is a no-latch metric, that is, the metric is ON only when the metric is in the trigger zone. Testing has shown that comparing roll acceleration vs. roll angle produces a reliable discrimination of a ramp event from an embankment event. This is because the roll acceleration vs. roll angle classification metric 224 produces a degree of separation in the metric values that is adequate to reliably discriminate between the ramp and embankment events. The roll acceleration vs. roll angle classification metric 224 therefore is utilized in the embankment discrimination algorithm 86 as a positive discrimination of an embankment event.

A pitch rate vs. roll angle classification metric 226 utilizes P_RATE and R_ANGLE to produce an output, which is fed to AND block 228. As shown, the pitch rate vs. roll angle classification metric 226 is ON when the metric is in the shaded trigger zone bounded by the dashed lines. The solid line in the pitch rate vs. roll angle classification metric 226 is representative of the metric when the vehicle is undergoing an embankment rollover event. The pitch rate vs. roll angle classification metric 226 is a no-latch metric, that is, the metric is ON only when the metric is in the trigger zone. Testing has shown that comparing pitch rate vs. roll angle produces a reliable discrimination of a ramp event from an embankment event. This is because the pitch rate vs. roll angle classification metric 226 produces a degree of separation in the metric values that is adequate to reliably discriminate between the ramp and embankment events. The pitch rate vs. roll angle classification metric 226 therefore is utilized in the embankment discrimination algorithm 86 as a positive discrimination of an embankment event.

Separating Ramp and Embankment Events

From the preceding paragraphs, and viewing FIGS. 4 and 5, it can be seen that the ramp and embankment discrimination algorithms 84, 86 use uses P_RATE and D_RATE to enhance the separation of ramp rollover events from embankment rollover events. The ramp and embankment discrimination algorithms 84, 86 use CCU_1Y_AMA and CCU_6Z_AMA to verify or corroborate discrimination of the ramp and embankment rollover events. Since, among all types of rollover events, the D_RATE for embankment rollovers is the least, the D_RATE can be implemented in the metrics to separate the embankment from the ramp events. Therefore, if P_RATE is not available, the D_RATE could discriminate the embankment event and discriminate it from a ramp event, i.e., AND gates 208 and 228 could be three-input gates omitting classification metrics 206 and 226, respectively. It should be noted, however, that is more robust using both P_RATE and D_RATE, i.e., using all four metrics as shown in FIGS. 4 and 5.

Ramp and embankment events produce similar lateral accelerations and roll rates. Therefore, as shown in FIGS. 4 and 5, the trigger zones for the lateral acceleration vs. roll rate classification metrics 200 and 220 can be similar or identical. Because the lateral accelerations are similar in both events, the classification metrics 200 and 220 comparing these values do not provide separation between ramp and embankment events. Since the lateral acceleration CCU_1 Y_AMA acts predictably and repeatably in response to ramp and embankment events, even though they can't discriminate between ramp and embankments, they can be used corroborate or confirm the occurrence of these events.

Ramp and embankment events produce markedly different roll accelerations (D_RATE). Therefore, as shown in FIGS. 4 and 5, the trigger zones for roll acceleration vs. roll rate metrics for ramp discrimination 204 differ from those for embankment discrimination 224. Accordingly, classification metric 204 will be ON in the event of a ramp event and OFF for an embankment event. Conversely, The classification metrics 204 and 224 can therefore discriminate between these events in a manner that is predictable, repeatable, and reliable.

Ramp and embankment events also produce markedly different pitch rates (P_RATE). Therefore, as shown in FIGS. 4 and 5, the trigger zones for pitch rate vs. roll rate metrics for ramp discrimination 206 differ from those for embankment discrimination 226. The classification metrics 206 and 226 can therefore discriminate between these events in a manner that is predictable, repeatable, and reliable.

Embankment and Soil Events

As stated previously, an embankment event is one in which a rollover results from one side of the vehicle travelling down an embankment on the side of the road. A soil event is one in which a vehicle sliding laterally off the roadway engages soil or other material, which grabs the tires/wheels and causes the vehicle to roll over. Comparing left vehicle rollover events, for example, a left embankment rollover event results from the left side of the vehicle moving/accelerating downward along the embankment structure, producing a left roll about the vehicle longitudinal, X-axis. A left soil rollover event results from lateral vehicle movement to the left or toward the driver side along the vehicle lateral, Y-axis, that is terminated or decelerated abruptly, producing a left roll about the vehicle longitudinal, X-axis. For purposes of providing enhanced occupant protection, it can be advantageous to discriminate an embankment event from a soil event.

Hard Soil Discrimination

Figure 6:
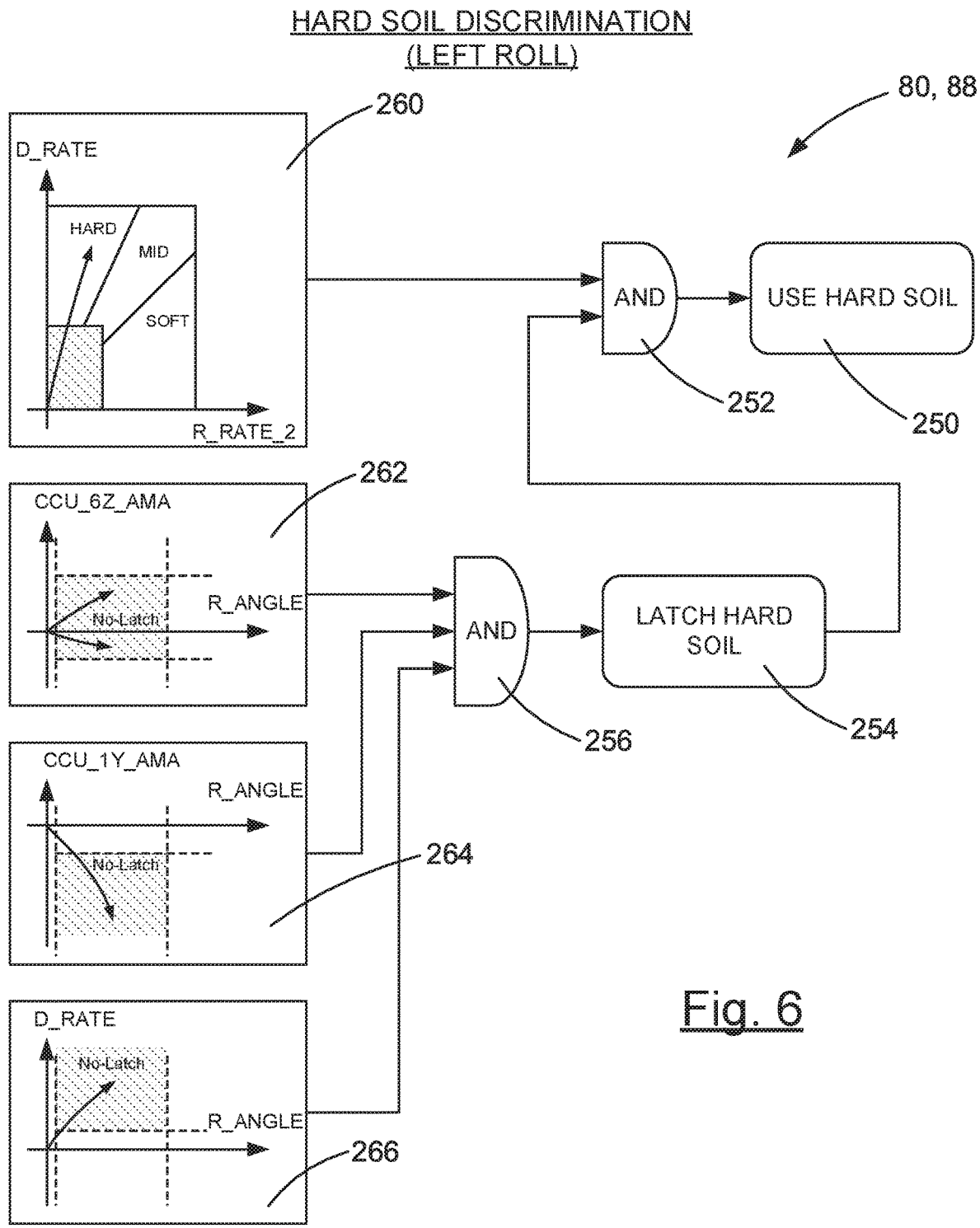
FIG. 6 is a schematic block diagram illustrating a hard soil discrimination algorithm implemented by the vehicle safety system.

A hard soil discrimination algorithm 88 is shown in FIG. 6. The hard soil discrimination algorithm 88 is used to determine whether to use the hard soil thresholds (see FIG. 3) when deploying the actuatable restraints. The hard soil discrimination algorithm 88 of FIG. 6 is shown for left roll events, i.e., the vehicle rolling to the left or driver side. It should, however, be appreciated that the algorithms shown in FIG. 6 also apply to right roll events, the only difference being sign (+/−) of the values used in the metrics is opposite. In other words, the metrics for right roll events would be identical to those shown in FIG. 6, except that the sign of the respective axes for the different metric values would be opposite, e.g., negative instead of positive and vice versa.

Soil events are those in which the vehicle slides laterally off the roadway and onto soil. Classifying soil events as hard, medium, and soft in by the enhanced discrimination algorithms provides a tailored response to the unique crash characteristics involved with these crash scenarios. The hard soil event can also be categorized as a tripping event, such as when the vehicle slides laterally off the roadway and strikes a curb, which "trips" the vehicle, causing the resulting rollover to develop quickly.

The hard soil discrimination algorithm 88 implements four different metrics to discriminate between a ramp and embankment event. The four metrics are:
D_RATE vs. R_RATE_2
CCU_6Z vs. R_ANGLE
CCU_1Y_AMA vs. R_ANGLE
D_RATE vs. R_ANGLE A USE HARD SOIL determination is made at block 250 in response to the classification metric 260 and the LATCH HARD SOIL block 254 fed into AND block 252 being satisfied, i.e., a Boolean one, referred to herein as ON. The LATCH HARD SOIL block 254 is a latched determination, meaning that once AND block 256 is satisfied, LATCH HARD SOIL 254 is ON and remains ON, even after the metrics fed into AND block 256 cease to be ON. Classification metrics 262, 264, and 266 are fed into AND block 256. The classification metrics 260, 262, 264, 266 are described in the following paragraphs.

An angular or roll acceleration vs. roll rate classification metric 260 utilizes D_RATE and R_RATE_2 to produce an output, which is fed to AND block 252. As shown, the roll acceleration vs. roll rate classification metric 260 is ON when the metric is in the HARD trigger zone defined by the solid lines of the metric. The trigger zone indicated by the classification metric 260 is that of the zone (HARD, MID, SOFT) that the metric first enters from the shaded region. In other words, the trigger zone is latched in the classification metric 260. Thus, if the metric first enters the HARD trigger zone and subsequently moves to the MID and/or SOFT trigger zone, the HARD trigger zone indication remains ON and the MID and/or SOFT trigger zone indications remain OFF. The solid line in the roll acceleration vs. roll rate classification metric 260 is representative of the metric when the vehicle is undergoing a hard soil rollover event.

A hard soil event, such as a curb tripping, results in a high magnitude roll acceleration due to the immediate onset of high sliding resistance afforded by the hard soil surface, i.e., curb. The roll acceleration vs. roll rate classification metric 260, being configured to classify this high magnitude roll acceleration in the HARD trigger zone provides a reliable discrimination of the hard soil event. Additionally, testing has shown that the roll acceleration vs. roll rate classification metric 260 produces a degree of separation in the metric values that is adequate to reliably discriminate between a hard soil and embankment event. The roll acceleration vs. roll rate classification metric 260 can therefore be utilized in the hard soil discrimination algorithm 88 as a positive discrimination of a hard soil event.

A vertical acceleration vs. roll angle classification metric 262 utilizes CCU_6ZY_AMA and R_ANGLE to produce an output, which is fed to AND block 256. As shown, the vertical acceleration vs. roll angle classification metric 262 is ON when the metric is in the shaded trigger zone bounded by the dashed lines. The solid line in the vertical acceleration vs. roll angle classification metric 262 is representative of the metric when the vehicle is undergoing a hard soil rollover event. The vertical acceleration vs. roll angle classification metric 262 is a no-latch metric, that is, the metric is ON only when the metric is in the trigger zone. Testing has shown that the vertical acceleration vs. roll angle classification metric 262 does not produce separation sufficient to reliably discriminate between the hard soil and embankment events. Therefore, the vertical acceleration vs. roll angle classification metric 262 is utilized in the hard soil discrimination algorithm 88 as confirmation (at AND block 256) when the other classification metrics 264, 266 are in agreement on discriminating the occurrence of a hard soil event.

A lateral acceleration vs. roll angle classification metric 264 utilizes CCU_1Y_AMA and R_ANGLE to produce an output, which is fed to AND block 256. As shown, the lateral acceleration vs. roll angle classification metric 264 is ON when the metric is in the shaded trigger zone bounded by the dashed lines. The solid line in the lateral acceleration vs. roll angle classification metric 264 is representative of the metric when the vehicle is undergoing a hard soil rollover event. The lateral acceleration vs. roll angle classification metric 264 is a no-latch metric, that is, the metric is ON only when the metric is in the trigger zone. Testing has shown that comparing roll acceleration vs. roll angle produces a reliable discrimination of a hard soil event from an embankment event. This is because the roll acceleration vs. roll angle classification metric 264 produces a degree of separation in the metric values that is adequate to reliably discriminate between the hard soil and embankment events. The roll acceleration vs. roll angle classification metric 264 therefore is utilized in hard soil discrimination algorithm 88 as a positive discrimination of a hard soil event.

An angular or roll acceleration vs. roll angle classification metric 266 utilizes D_RATE and R_ANGLE to produce an output, which is fed to AND block 256. As shown, the roll acceleration vs. roll angle classification metric 266 is ON when the metric is in the shaded trigger zone bounded by the dashed lines. The solid line in the roll acceleration vs. roll angle classification metric 256 is representative of the metric when the vehicle is undergoing a hard soil rollover event. The roll acceleration vs. roll angle classification metric 266 is a non-latch metric, that is, that is, the metric is ON only when the metric is in the trigger zone. Testing has shown that the lateral acceleration vs. roll angle classification metric 266 does not produce separation sufficient to reliably discriminate between the hard soil and embankment events. Therefore, the lateral acceleration vs. roll angle classification metric 266 is utilized in the hard soil discrimination algorithm 88 as confirmation (at AND block 256) when the other classification metrics 262, 264 are in agreement on discriminating the occurrence of a hard soil event.

Mid-Soil Discrimination

Figure 7:
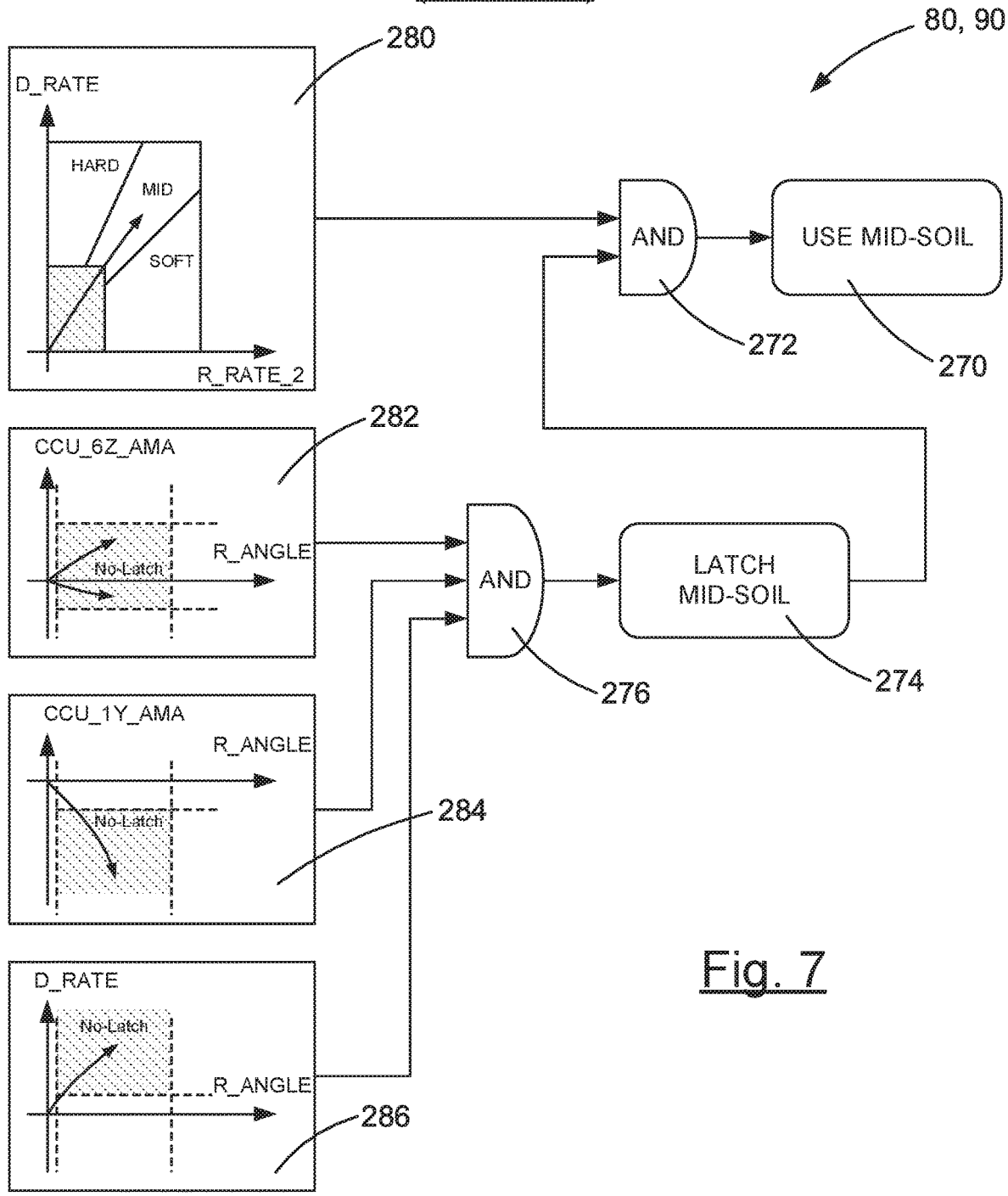
FIG. 7 is a schematic block diagram illustrating a mid-soil discrimination algorithm implemented by the vehicle safety system.

A mid-soil discrimination algorithm 90 is shown in FIG. 7. The mid-soil discrimination algorithm 90 is used to determine whether to use the mid-soil thresholds (see FIG. 3) when deploying the actuatable restraints. The mid-soil discrimination algorithm 90 of FIG. 7 is shown for left roll events, i.e., the vehicle rolling to the left or driver side. It should, however, be appreciated that the algorithms shown in FIG. 7 also apply to right roll events, the only difference being sign (+/−) of the values used in the metrics is opposite. In other words, the metrics for right roll events would be identical to those shown in FIG. 7, except that the sign of the respective axes for the different metric values would be opposite, e.g., negative instead of positive and vice versa.

Soil events are those in which the vehicle slides laterally off the roadway and onto soil. Classifying soil events as hard, medium, and soft in by the enhanced discrimination algorithms provides a tailored response to the unique crash characteristics involved with these crash scenarios. The mid-soil event can also be categorized as an event that doesn't produce accelerations of a magnitude as high as a hard soil or tripping event, but higher than those associated with a soft soil event, such as a lawn or grassy field. Mid-soil events can be those between a hard and soft soil event, for example, when the vehicle slides laterally off the roadway onto dry, hard packed soil and/or gravel, which causes the resulting rollover to develop slower than a hard soil event but faster than a soft soil event.

The mid-soil discrimination algorithm 90 implements four different metrics to discriminate between a ramp and embankment event. The four metrics are:

D_RATE vs. R_RATE_2
CCU_6Z vs. R_ANGLE
CCU_1Y_AMA vs. R_ANGLE
D_RATE vs. R_ANGLE

A USE MID-SOIL determination is made at block 270 in response to the classification metric 280 and the LATCH MID-SOIL block 274 fed into AND block 272 being satisfied, i.e., a Boolean one, referred to herein as ON. The LATCH MID-SOIL block 274 is a latched determination, meaning that once AND block 276 is satisfied, LATCH MID-SOIL 274 is ON and remains ON, even after the metrics fed into AND block 276 cease to be ON. Classification metrics 282, 284, and 286 are fed into AND block 276. The classification metrics 280, 282, 284, 286 are described in the following paragraphs.

An angular or roll acceleration vs. roll rate classification metric 280 utilizes D_RATE and R_RATE_2 to produce an output, which is fed to AND block 272. As shown, the roll acceleration vs. roll rate classification metric 280 is ON when the metric is in the MID trigger zone defined by the solid lines of the metric. The trigger zone indicated by the classification metric 280 is that of the zone (HARD, MID, SOFT) that the metric first enters from the shaded region. In other words, the trigger zone is latched in the classification metric 280. Thus, if the metric first enters the MID trigger zone and subsequently moves to the HARD and/or SOFT trigger zone, the MID trigger zone indication remains ON and the HARD and/or SOFT trigger zone indications remain OFF.

A mid-soil event, such as hard packed, dry soil and/or gravel, results in roll acceleration having a magnitude lower than that of a hard soil event due to the rapid onset of siding high resistance afforded by the mid-soil surface. The roll acceleration vs. roll rate classification metric 280, being configured to classify this roll acceleration in the MID trigger zone provides a reliable discrimination of the mid-soil event. Additionally, testing has shown that the roll acceleration vs. roll rate classification metric 280 produces a degree of separation in the metric values that is adequate to reliably discriminate between a mid-soil and embankment event. The roll acceleration vs. roll rate classification metric 280 can therefore be utilized in the mid-soil discrimination algorithm 90 as a positive discrimination of a mid-soil event. The solid line in the roll acceleration vs. roll rate classification metric 280 is representative of the metric when the vehicle is undergoing a mid-soil rollover event.

A vertical acceleration vs. roll angle classification metric 282 utilizes CCU_6ZY_AMA and R_ANGLE to produce an output, which is fed to AND block 276. As shown, the vertical acceleration vs. roll angle classification metric 282 is ON when the metric is in the shaded trigger zone bounded by the dashed lines. The solid line in the vertical acceleration vs. roll angle classification metric 282 is representative of the metric when the vehicle is undergoing a mid-soil rollover event. The vertical acceleration vs. roll angle classification metric 282 is a no-latch metric, that is, the metric is ON only when the metric is in the trigger zone. Testing has shown that the vertical acceleration vs. roll angle classification metric 282 does not produce separation sufficient to reliably discriminate between the mid-soil and embankment events. Therefore, the vertical acceleration vs. roll angle classification metric 282 is utilized in the mid-soil discrimination algorithm 90 as confirmation (at AND block 276) when the other classification metrics 284, 286 are in agreement on discriminating the occurrence of a mid-soil event.

A lateral acceleration vs. roll angle classification metric 284 utilizes CCU_1Y_AMA and R_ANGLE to produce an output, which is fed to AND block 276. As shown, the lateral acceleration vs. roll angle classification metric 284 is ON when the metric is in the shaded trigger zone bounded by the dashed lines. The solid line in the lateral acceleration vs. roll angle classification metric 284 is representative of the metric when the vehicle is undergoing a mid-soil rollover event. The lateral acceleration vs. roll angle classification metric 284 is a no-latch metric, that is, the metric is ON only when the metric is in the trigger zone. Testing has shown that comparing roll acceleration vs. roll angle produces a reliable discrimination of a mid-soil event from an embankment event. This is because the roll acceleration vs. roll angle classification metric 284 produces a degree of separation in the metric values that is adequate to reliably discriminate between the mid-soil and embankment events. The roll acceleration vs. roll angle classification metric 284 therefore is utilized in mid-soil discrimination algorithm 90 as a positive discrimination of a mid-soil event.

An angular or roll acceleration vs. roll angle classification metric 286 utilizes D_RATE and R_ANGLE to produce an output, which is fed to AND block 276. As shown, the roll acceleration vs. roll angle classification metric 286 is ON when the metric is in the shaded trigger zone bounded by the dashed lines. The solid line in the roll acceleration vs. roll angle classification metric 286 is representative of the metric when the vehicle is undergoing a mid-soil rollover event. The roll acceleration vs. roll angle classification metric 286 is a non-latch metric, that is, the metric is ON only when the metric is in the trigger zone. Testing has shown that the lateral acceleration vs. roll angle classification metric 286 does not produce separation sufficient to reliably discriminate between the mid-soil and embankment events. Therefore, the lateral acceleration vs. roll angle classification metric 286 is utilized in the mid-soil discrimination algorithm 90 as confirmation (at AND block 276) when the other classification metrics 282, 284 are in agreement on discriminating the occurrence of a mid-soil event.

Soft Soil Discrimination

Figure 8:
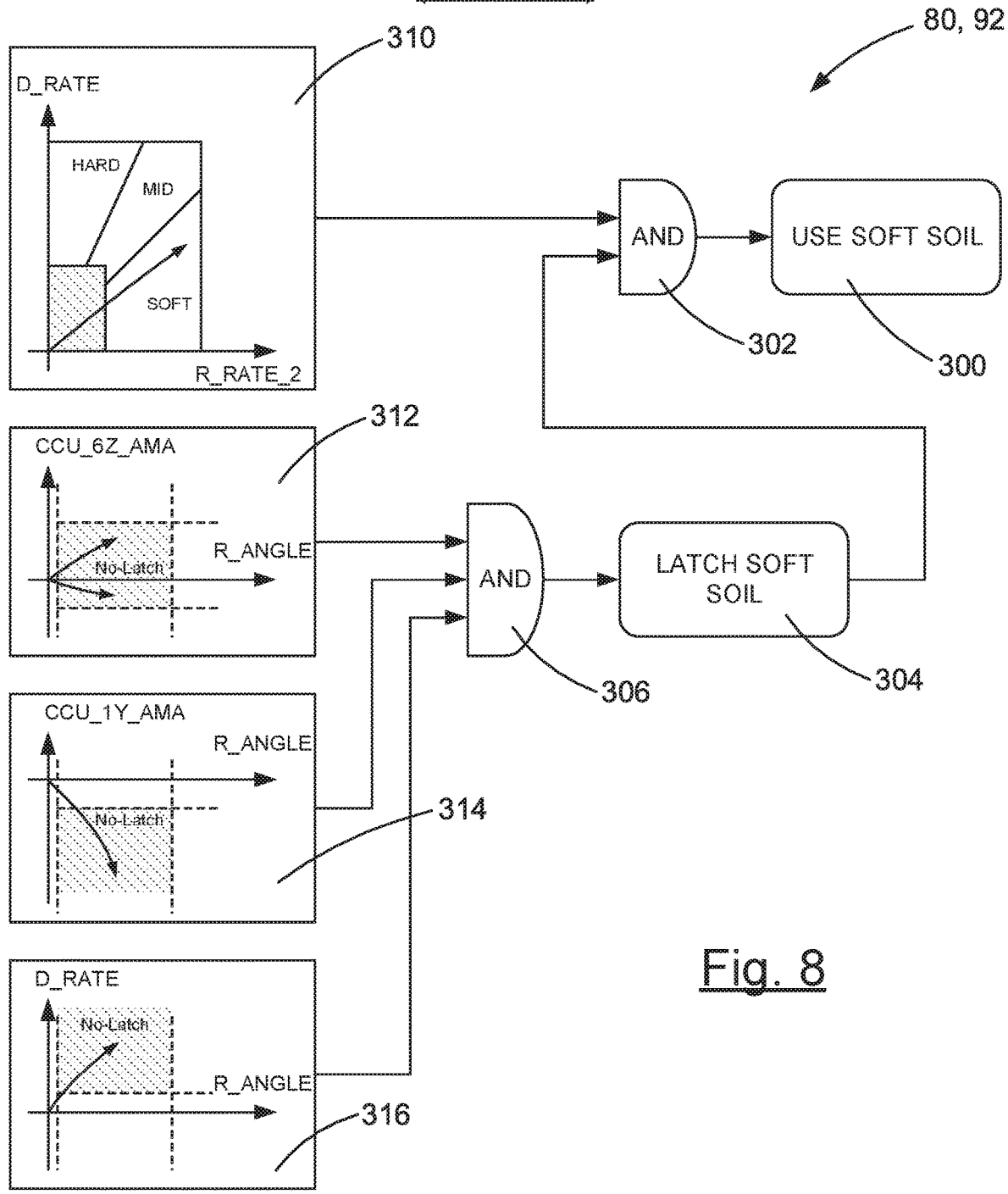
FIG. 8 is a schematic block diagram illustrating a soft soil discrimination algorithm implemented by the vehicle safety system.

A soft soil discrimination algorithm 92 is shown in FIG. 8. The soft soil discrimination algorithm 92 is used to determine whether to use the soft soil thresholds (see FIG. 3) when deploying the actuatable restraints. The soft soil discrimination algorithm 92 of FIG. 8 is shown for left roll events, i.e., the vehicle rolling to the left or driver side. It should, however, be appreciated that the algorithms shown in FIG. 8 also apply to right roll events, the only difference being sign (+/−) of the values used in the metrics is opposite. In other words, the metrics for right roll events would be identical to those shown in FIG. 8, except that the sign of the respective axes for the different metric values would be opposite, e.g., negative instead of positive and vice versa.

Soil events are those in which the vehicle slides laterally off the roadway and onto soil. Classifying soil events as hard, medium, and soft provides a tailored response to the unique crash characteristics involved with these crash scenarios. The soft soil event can also be categorized as an event that doesn't produce accelerations of a magnitude as high as a mid or hard soil or tripping event. Soft soil events can, for example, occur when the vehicle slides laterally off the roadway onto a lawn or grassy field, which causes the resulting rollover to develop slower than both hard and mid-soil events.

The soft soil discrimination algorithm 92 implements four different metrics to discriminate between a ramp and embankment event. The four metrics are:

D_RATE vs. R_RATE_2
CCU_6Z vs. R_ANGLE
CCU_1Y_AMA vs. R_ANGLE
D_RATE vs. R_ANGLE

A USE SOFT SOIL determination is made at block 300 in response to the classification metric 310 and the LATCH SOFT SOIL block 304 fed into AND block 302 being satisfied, i.e., a Boolean one, referred to herein as ON. The LATCH SOFT SOIL block 304 is a latched determination, meaning that once AND block 306 is satisfied, LATCH SOFT SOIL 304 is ON and remains ON, even after the metrics fed into AND block 306 cease to be ON. Classification metrics 312, 314, and 316 are fed into AND block 306. The classification metrics 310, 312, 314, 316 are described in the following paragraphs.

An angular or roll acceleration vs. roll rate classification metric 310 utilizes D_RATE and R_RATE_2 to produce an output, which is fed to AND block 302. As shown, the roll acceleration vs. roll rate classification metric 310 is ON when the metric is in the SOFT trigger zone defined by the solid lines of the metric. The trigger zone indicated by the classification metric 310 is that of the zone (HARD, MID, SOFT) that the metric first enters from the shaded region. In other words, the trigger zone is latched in the classification metric 310. Thus, if the metric first enters the SOFT trigger zone and subsequently moves to the HARD and/or MID trigger zone, the SOFT trigger zone indication remains ON and the HARD and/or MID trigger zone indications remain OFF.

A soft soil event, such as hard packed, dry soil and/or gravel, results in roll acceleration having a magnitude lower than that of a hard soil event due to the rapid onset of siding high resistance afforded by the soft soil surface. The roll acceleration vs. roll rate classification metric 310, being configured to classify this roll acceleration in the SOFT trigger zone provides a reliable discrimination of the soft soil event. Additionally, testing has shown that the roll acceleration vs. roll rate classification metric 310 produces a degree of separation in the metric values that is adequate to reliably discriminate between a soft soil and embankment event. The roll acceleration vs. roll rate classification metric 310 can therefore be utilized in the soft soil discrimination algorithm 92 as a positive discrimination of a soft soil event. The solid line in the roll acceleration vs. roll rate classification metric 310 is representative of the metric when the vehicle is undergoing a soft soil rollover event.

A vertical acceleration vs. roll angle classification metric 312 utilizes CCU_6ZY_AMA and R_ANGLE to produce an output, which is fed to AND block 306. As shown, the vertical acceleration vs. roll angle classification metric 312 is ON when the metric is in the shaded trigger zone bounded by the dashed lines. The solid line in the vertical acceleration vs. roll angle classification metric 312 is representative of the metric when the vehicle is undergoing a soft soil rollover event. The vertical acceleration vs. roll angle classification metric 312 is a no-latch metric, that is, the metric is ON only when the metric is in the trigger zone. Testing has shown that the vertical acceleration vs. roll angle classification metric 312 does not produce separation sufficient to reliably discriminate between the soft soil and embankment events. Therefore, the vertical acceleration vs. roll angle classification metric 312 is utilized in the soft soil discrimination algorithm 92 as confirmation (at AND block 306) when the other classification metrics 314, 316 are in agreement on discriminating the occurrence of a soft soil event.

A lateral acceleration vs. roll angle classification metric 314 utilizes CCU_1Y_AMA and R_ANGLE to produce an output, which is fed to AND block 306. As shown, the lateral acceleration vs. roll angle classification metric 314 is ON when the metric is in the shaded trigger zone bounded by the dashed lines. The solid line in the lateral acceleration vs. roll angle classification metric 314 is representative of the metric when the vehicle is undergoing a soft soil rollover event. The lateral acceleration vs. roll angle classification metric 314 is a no-latch metric, that is, the metric is ON only when the metric is in the trigger zone. Testing has shown that comparing roll acceleration vs. roll angle produces a reliable discrimination of a soft soil event from an embankment event. This is because the roll acceleration vs. roll angle classification metric 314 produces a degree of separation in the metric values that is adequate to reliably discriminate between the soft soil and embankment events. The roll acceleration vs. roll angle classification metric 314 therefore is utilized in soft soil discrimination algorithm 92 as a positive discrimination of a soft soil event.

An angular or roll acceleration vs. roll angle classification metric 316 utilizes D_RATE and R_ANGLE to produce an output, which is fed to AND block 306. As shown, the roll acceleration vs. roll angle classification metric 316 is ON when the metric is in the shaded trigger zone bounded by the dashed lines. The solid line in the roll acceleration vs. roll angle classification metric 316 is representative of the metric when the vehicle is undergoing a soft soil rollover event. The roll acceleration vs. roll angle classification metric 316 is a non-latch metric, that is, the metric is ON only when the metric is in the trigger zone. Testing has shown that the lateral acceleration vs. roll angle classification metric 316 does not produce separation sufficient to reliably discriminate between the soft soil and embankment events. Therefore, the lateral acceleration vs. roll angle classification metric 316 is utilized in the soft soil discrimination algorithm 92 as confirmation (at AND block 306) when the other classification metrics 312, 314 are in agreement on discriminating the occurrence of a soft soil event.

Rollover Discrimination

From the above, it will be appreciated that the enhanced discrimination algorithms shown in FIGS. 4-8 and described herein can be implemented in a vehicle safety system to discriminate between a ramp rollover event (FIG. 4), an embankment rollover event (FIG. 5), a hard soil rollover event (FIG. 6), a mid-soil rollover event (FIG. 7), and a soft soil rollover event (FIG. 8). As described above, these discriminations are performed with a high degree of mutual exclusivity, i.e., discrimination of any one of these events is, with a high degree of accuracy, to the exclusion of the others. The enhanced discrimination algorithms are therefore capable of identifying and classifying a rollover event as falling into one of these categories. The vehicle safety system can select thresholds for deploying actuatable restraints, such as airbags and seatbelts based on the classified rollover event, thus improving the level of occupant protection afforded by the vehicle safety system.

From the above description of the invention, those skilled in the art will appreciate that the described vehicle safety system and methods implement algorithms that can discriminate ramp rollover events from embankment rollover events and also can discriminate soil rollover events from embankment rollover events. Those skilled in the art will also perceive improvements, changes and modifications to the disclosed system and methods that fall within the spirit and scope of the invention. These improvements, changes, and/or modifications are intended to be covered by the appended claims.

Having described the invention, the following is claimed:

1. A vehicle safety system comprising:
an actuatable restraint for helping to protect a vehicle occupant; and
a controller for controlling actuation of the actuatable restraint in response to a vehicle rollover event;
wherein the controller is configured to execute a discrimination algorithm comprising at least one classification metric that utilizes at least one of vehicle pitch rate (P_RATE) and vehicle roll acceleration (D_RATE) to discriminate at least one of a ramp rollover event and a soil rollover event from an embankment rollover event, wherein the discrimination algorithm determines a classification of the vehicle rollover event, and wherein the classification is one of a ramp rollover event, a soil rollover event, and an embankment rollover event; and
wherein the controller is further configured to select a deployment threshold for deploying the actuatable restraint, the deployment threshold corresponding to the classification of the vehicle rollover event, wherein the at least one classification metric comprises a classification metric that evaluates vehicle roll acceleration (D_RATE) vs. vehicle roll angle (R_ANGLE).

2. The system recited in claim 1, wherein;
the controller is configured to execute the classification metric that evaluates vehicle roll acceleration (D_RATE) vs. vehicle roll angle (R_ANGLE) to discriminate a ramp rollover event from an embankment rollover event.

3. The system recited in claim 2, wherein:
the at least one classification metric further comprises a classification metric that evaluates vehicle pitch rate (P_RATE) vs. vehicle roll angle (R_ANGLE); and
the controller is configured to execute the classification metric that evaluates vehicle pitch rate (P_RATE) vs. vehicle roll angle (R_ANGLE) to discriminate a ramp rollover event from an embankment rollover event.

4. The system recited in claim 3, wherein:
the at least one classification metric further comprises a classification metric that evaluates vehicle lateral acceleration moving average (CCU_1Y_AMA) vs. vehicle roll angle (R_ANGLE); and
the controller is configured to execute the classification metric that evaluates vehicle lateral acceleration moving average (CCU_1Y_AMA) vs. vehicle roll angle (R_ANGLE) to verify the discrimination of a ramp rollover event from an embankment rollover event.

5. The system recited in claim 3, wherein:
the at least one classification metric further comprises a classification metric that evaluates vehicle vertical acceleration moving average (CCU_6Z_AMA) vs the vehicle roll angle (R_ANGLE); and
the controller is configured to execute the classification metric that evaluates vehicle vertical acceleration moving average (CCU_6Z_AMA) vs the vehicle roll angle (R_ANGLE) to verify the discrimination of a ramp rollover event from an embankment rollover event.

6. The system recited in claim 1, wherein
the controller is configured to execute the classification metric that evaluates vehicle roll acceleration (D_RATE) vs. vehicle roll angle (R_ANGLE) to discriminate a soil rollover event from an embankment rollover event.

7. The system recited in claim 6, wherein the discrimination algorithm further comprises a classification metric that evaluates vehicle roll acceleration (D_RATE) vs. vehicle roll rate (R_RATE_2); and
the controller is configured to execute the classification metric that evaluates vehicle roll acceleration (D_RATE) vs. vehicle roll rate (R_RATE_2) to discriminate a soil rollover event from an embankment rollover event.

8. The system recited in claim 7, wherein controller is configured to execute the classification metric that evaluates vehicle roll acceleration (D_RATE) vs. vehicle roll rate (R_RATE_2) to discriminate between a hard soil rollover event, a mid-soil rollover event, and a soft soil rollover event.

9. The system recited in claim 7, wherein:
the at least one classification metric further comprises a classification metric that evaluates vehicle lateral acceleration moving average (CCU_1Y_AMA) vs. vehicle roll angle (R_ANGLE); and
the controller is configured to execute the classification metric that evaluates vehicle lateral acceleration moving average (CCU_1Y_AMA) vs. vehicle roll angle (R_ANGLE) to discriminate a soil rollover event from an embankment rollover event.

10. The system recited in claim 7, wherein:
the at least one classification metric further comprises a classification metric that evaluates vehicle vertical acceleration moving average (CCU_6Z_AMA) vs the vehicle roll angle (R_ANGLE); and
the controller is configured to execute the classification metric that evaluates vehicle vertical acceleration moving average (CCU_6Z_AMA) vs the vehicle roll angle (R_ANGLE) to verify the discrimination of a soil rollover event from an embankment rollover event.

11. A vehicle safety system comprising:
an actuatable restraint for helping to protect a vehicle occupant; and
a controller for controlling actuation of the actuatable restraint in response to a vehicle rollover event;
wherein the controller is configured to execute a discrimination algorithm comprising at least one classification metric that utilizes at least one of vehicle pitch rate (P_RATE) and vehicle roll acceleration (D_RATE) to discriminate at least one of a ramp rollover event and a soil rollover event from an embankment rollover event, wherein the discrimination algorithm determines a classification of the vehicle rollover event, and wherein the classification is one of a ramp rollover event, a soil rollover event, and an embankment rollover event; and
wherein the controller is further configured to select a deployment threshold for deploying the actuatable restraint, the deployment threshold corresponding to the classification of the vehicle rollover event, wherein the controller is configured to execute deployment threshold metrics for determining whether to actuate the actuatable restraint, wherein the deployment threshold metrics evaluate vehicle roll acceleration (D_RATE) vs. vehicle roll angle (R_ANGLE), and wherein the controller is configured to deploy the actuatable restraint in response to the deployment threshold metrics exceeding the deployment threshold.

12. The system recited in claim 1, further comprising:
an accelerometer for sensing vehicle lateral acceleration and providing a signal indicative of sensed vehicle lateral acceleration (CCU_1Y);
an accelerometer for sensing vehicle vertical acceleration and providing a signal indicative of sensed vehicle vertical acceleration (CCU_6Z); and
a roll rate sensor for sensing vehicle roll rate values and providing a signal indicative of sensed vehicle roll rate values (CCU_4R);
wherein the controller is configured to execute vehicle metric calculations to:
determine vehicle lateral acceleration moving average (CCU_1Y_AMA) from the signal indicative of sensed vehicle lateral acceleration (CCU_1Y);
determine vehicle vertical acceleration moving average (CCU_6Z_AMA) from the signal indicative of sensed vehicle vertical acceleration (CCU_6Z);
determine vehicle roll acceleration (D_RATE) from the signal indicative of sensed vehicle roll rate values (CCU_4R); and
determine vehicle roll angle (R_ANGLE) from the signal indicative of sensed vehicle roll rate values (CCU_4R).

13. A vehicle safety system comprising:
an actuatable restraint for helping to protect a vehicle occupant; and
a controller for controlling actuation of the actuatable restraint in response to a vehicle rollover event;
wherein the controller is configured to execute a discrimination algorithm comprising at least one classification metric that utilizes at least one of vehicle pitch rate (P_RATE) and vehicle roll acceleration (D_RATE) to discriminate at least one of a ramp rollover event and a soil rollover event from an embankment rollover event, wherein the discrimination algorithm determines a classification of the vehicle rollover event, and wherein the classification is one of a ramp rollover event, a soil rollover event, and an embankment rollover event; and
wherein the controller is further configured to select a deployment threshold for deploying the actuatable restraint, the deployment threshold corresponding to the classification of the vehicle rollover event, wherein the safety system further comprises a pitch rate sensor for sensing vehicle pitch rate values and providing a signal indicative of sensed vehicle pitch rate (CCU_5P), wherein the controller is configured to execute vehicle metric calculations to determine vehicle pitch rate (P_RATE) from the signal indicative of sensed vehicle pitch rate (CCU_5P).

14. The system recited in claim 1, wherein the actuatable restraints comprise at least one of seatbelt anchor pretensioners, seatbelt retractor pretensioners, curtain airbags, thorax airbags, side airbags, emergency notifications, door unlock commands, and high-voltage powertrain cutoff commands.

15. A vehicle safety system comprising:
an actuatable restraint for helping to protect a vehicle occupant; and
a controller for controlling actuation of the actuatable restraint in response to a vehicle rollover event;
wherein the controller is configured to execute a discrimination algorithm comprising at least one classification metric that utilizes at least one of vehicle pitch rate (P_RATE) and vehicle roll acceleration (D_RATE) to discriminate at least one of a ramp rollover event and a soil rollover event from an embankment rollover event, wherein the discrimination algorithm determines a classification of the vehicle rollover event, and wherein the classification is one of a ramp rollover event, a soil rollover event, and an embankment rollover event; and
wherein the controller is further configured to select a deployment threshold for deploying the actuatable restraint, the deployment threshold corresponding to the classification of the vehicle rollover event, and wherein the controller is further configured to issue at least one of emergency notifications, door unlock commands, and high-voltage powertrain cutoff commands in response to actuating the actuatable restraints.

* * * * *